United States Patent [19]

Takeuchi et al.

[11] 4,298,795

[45] Nov. 3, 1981

[54] METHOD AND APPARATUS FOR INTRODUCING SAMPLES TO A MASS SPECTROMETER

[75] Inventors: Tsugio Takeuchi; Shin Tsuge, both of Nagoya; Yukio Hirata, Toyohashi; Koichi Mochizuki, Tsushima, all of Japan

[73] Assignee: Japan Spectroscopic Co. Ltd, Tokyo, Japan

[21] Appl. No.: 38,264

[22] Filed: May 11, 1979

[30] Foreign Application Priority Data

Sep. 8, 1978 [JP] Japan ................................ 53-111130

[51] Int. Cl.$^{3}$ ................................ B01D 59/44

[52] U.S. Cl. ................................ 250/282; 250/288

[58] Field of Search ............... 250/288, 281, 282, 289, 250/423 R, 427; 73/61.1 C, 61.1 R

[56] References Cited

U.S. PATENT DOCUMENTS

| | | | |
|---|---|---|---|
| 3,458,699 | 7/1969 | Padrta | 250/288 |
| 3,633,027 | 1/1972 | Ryhage | 250/288 |
| 3,896,661 | 7/1975 | Parkhurst et al. | 250/288 |
| 3,999,065 | 12/1976 | Briggs | 250/288 |
| 4,008,388 | 2/1977 | McLafferty et al. | 250/281 |
| 4,046,012 | 9/1977 | Studenick | 250/288 |
| 4,112,297 | 9/1978 | Miyagi et al. | 250/281 |
| 4,160,161 | 7/1979 | Horton | 250/281 |

OTHER PUBLICATIONS

"Continuous M.S. Monitoring of a Liquid Chro. with Subanogram Sensitivity Using an On-Line Computer", McLafferty et al., Anal. Chem., vol. 47, No. 9, Aug. 75, pp. 1503–1505.

"Vacuum Nebulizing Interface for Direct Coupling of Micro-Liquid Chromatograph and Mass Spect.", Tsuge et al., *Anal. Chem.,* vol. 51, No. 1, Jan. 1979.

"The Application of a New-Sampling Tech. Using an Atomizer for Chemical Ionization Mass Spect. to Free Amino Acids, Drug Components, Higher Phthalates and Oligomers of Styrene and Ethleneglycol", Hirata et al., *Organic Mass Spectr.,* vol. 14. No. 3, 1979.

"Direct Measurement of Mass Fragmentograms for Elements from a Micro-Liquid Chromatograph Using an Improved Nebulizing Interface", Yoshida et al., *Journal of HRC & CC,* vol. 3, Jan. 1980.

*Primary Examiner*—Bruce C. Anderson

*Attorney, Agent, or Firm*—Browdy and Neimark

[57] ABSTRACT

Simplified method and apparatus for connecting a liquid chromatograph, particularly of a high-performance type, directly to a mass spectrometer without using any complicated devices conventionally available, for the purpose of continuous and stable mass spectrometric measurement of a liquid sample, either liquid or solution, more commonly an effluent supplied directly from a column of the liquid chromatograph or an aliquot portion thereof extracted through a simple and ordinary splitter, or any other liquid samples prepared for the mass spectrometric analysis. Such a liquid sample is first sprayed into finely divided particles by a nebulizing means mainly consisting of a double-tubing capillary so that the sample is easily vaporized, and finally introduced into an ionizing portion of the mass spectrometer in continuous and stable manner.

19 Claims, 4 Drawing Figures

27
1b
1a
1
26
12
P
24
9
8b
8
23
P
25
8a
18
13

LC
He
2
4
1b
8
1
1a
12
P
14
22
1c
9
21
17a
M+
(M+1)+
17

METHOD AND APPARATUS FOR INTRODUCING SAMPLES TO A MASS SPECTROMETER

BACKGROUND OF THE INVENTION

The present invention relates generally to introduction of a sample to a mass spectrometer (MS) and is more particularly concerned with simplified method and apparatus by which a liquid sample is nebulized into fine particles in extremely efficient manner to facilitate vaporization thereof and the nebulized liquid sample is then continuously introduced to the MS thereby enabling the MS to handle a wider range of compounds for mass spectrometric measurement.

A mass spectrometer (MS) has been widely used as an instrument for performing both qualitative and quantitative analyses of different gases, volatile liquids and solid molecules by obtaining mass spectra thereof through measuring an ion current caused by ions collected on one or a plurality of fixed ion collector electrodes while adjusting or varying the accelerating potential and intensity of the magnetic field. In recent years, it has been attempted to employ such an MS in connection with another type of separating and analyzing instruments for efficient analysis of mixtures.

For example, a liquid chromatograph (LC), especially a high-performance liquid chromatograph (HLC), has attracted a good deal of attention in this field and is presently accepted as an excellent means for separating a mixture into its constituents and determining the individual constituents quantitatively or volumetrically mainly because it is capable of separating either fat- or water-soluble substances into its components, without any preliminary modification of such substances, by simply making a proper choice of a solvent and a separation column. Although such an HLC is given a surpassing capability of separating mixtures per minute, it has a disadvantage that it is not completely satisfactory in its ability of identifying the separated constituents. The mass spectrometer (MS), on the other hand, is extremely high in its sensitivity and performance in identification of a single component but it has also a disadvantage, at the same time, that it is accompanied with considerable difficulty when identifying a mixture because the spectra to be obtained are complicated. To make the effective use of the advantages and make up the disadvantages of both LC and MS instruments, there has been presented a LC-MS analyzing system which is a combination of the two.

Further, the analysis by mass spectrometry with use of the MS encounters various sorts of problems when the sample to be handled is a liquid or a solution of any solvent because the mass spectrometric analysis is achieved by ionizing the sample after it is converted into a gas state. In other words, any sample which is a liquid or solution requires vaporization thereof before it is introduced to an ionizing portion (ion source) of the MS. However, it is an extremely hard practice to attain continuous yet stable vaporization of such a liquid sample and the subsequent introduction thereof to the ion source especially when the sample is a polar or large molecular-weight compound. The compound LC-MS analyzing system previously described also has a potential of suffering from problems similar to those of the MS above indicated because the sample to be introduced to the MS of the system is an effluent from the separation column of the LC, which is a liquid. The most contributing causes preventing practical use of the LC-MS analyzing method are its difficulty in continuously removing a solvent (mobile phase) from a continuous flow of the effluent supplied, and the resultant failure in offering an effective means for concentrating the desired constituent present in the effluent.

To solve such problems as stated above, a variety of methods and procedures for introducing the liquid samples to the MS have been examined and proposed up to the present. Some of the most positively attempted solutions to the problems have been concerned with development of a so-called "interface", i.e. a means for connecting the LC to the MS to establish a LC-MS combined analyzing system, on which the spotlight of research workers' attention has been focused. Up to date, however, only a few reports of research on the LC-MS connecting methods have been made public, including the following:

(1) LC-EIMS Method

The LC-EIMS Method [J. Chromatogr., 99, 395 (1973)], which was developed by R. P. G. Scott et al. is characterized by a fine stainless steel wire traveling through an ion source of the MS wherein the ionization is carried out by an electron impact (EI). Approximately one percent (1%) of the effluent from the MS adheres to a portion of the traveling wire outside the housing of the MS and the solvent in the effluent adhering to the wire is removed during its travel through a preliminary heating and evacuation system whereby only the desired constituent of the effluent is finally introduced into the ion source. To ensure higher sealing performance of individual interface chambers which are in communication with the preliminary heating and evacuation system, the wire is passed through small jewel apertures provided in each of partition walls separating from one chamber to another. Scott et al. state in their report that this method is applied to handling mixtures of several different drugs and metabolites and of fermented products, and that the desired constituent detected and identified by the method ranges from $10^{-6}$ to $10^{-7}$ g per ml of the mixture to be handled. However, the method retain not a few points that should be improved before it is put into practice, including its possibility that the sample being fed by the wire may stick to the jewel apertures or the sample sticking to the apertures may be mixed with the newly fed sample on the wire while the wire is traveling through the apertures, as well as its insufficient capability of quantitative analysis.

(2) Direct Chemical Ionization (DCI) Method

The direct chemical ionization method [Org. Mass Spectrom., 7, 1353(1973)] was developed by McLafferty et al. It is well known that the chemical ionization (CI) method is effective in a combined system of a GC (gas chromatograph) and an MS. In a system of an LC coupled with the MS, however, there is a considerable difficulty in removing entirely the mobile phase of the LC which is a liquid. To overcome this difficulty of the LC-MS system, is proposed this DCI method which is intended to introduce a desired constituent of the effluent from the LC column together with the solvent thereof without previous removal of the latter, and to utilize the solvent vapor as a reagent gas thereby measuring the CI spectra. In the DCI method, an elution speed of the LC and a way of introducing the effluent to the ion source of the MS hold important keys to successful measurement of the CI spectra. But as far as these two conditions are properly established, the CIMS (Chemical Ionization Mass Spectrometer) is more easily connected to the LC than the EIMS (Electron Impact Ionization Mass Spectrometer), and has a potential of continuous measurement of the CI spectra. McLafferty et al. designed the LC-CIMS interface so that approximately one percent (1%) of the effluent from the LC is conducted through a glass capillary tube (0.076 mm in diameter) into the ion source. They applied the interface to a mixture of different steroids each being of 0.8 μmol and obtained a good result. However, this interface method has some disadvantages. At first, amount of effluent that can be used is as less as 1% and in addition, it is very difficult to manufacture the glass capillary which is so small in diameter. Even if it was possible, it would be a hard practice to feed the effluent through such a fine capillary. Another disadvantage of this method is caused by the fact that the effluent is introduced directly into a heated ion source. As a result, the introduction of the effluent is easily and frequently interrupted due to bumping or other phenomena at the ion source. This disadvantage has made it difficult to accomplish a continuous and stable vaporization of the effluent.

As indicated above, any one of the conventionally-available interfaces between the LC and MS instruments has a number of inherent problems such as complicated construction, less ease of operation and extremely high manufacturing cost, and in general, fails to completely satisfy the requirements as a practicable device. The conventional failure in providing the practicable interface device means that there is not yet developed any method and device commonly available for introducing liquid samples to the MS. To put the LC-MS analyzing procedure into practice, it is an urgent matter and need to provide a proper method for the liquid sample introduction to the MS and to develop an apparatus which is simple in construction, easy in operation, high in sample concentrating capability and performance, and low in manufacturing cost.

SUMMARY OF THE INVENTION

Through extensive and intensive research and experiments in view of the above need, the inventors have come to the conclusion that all of the previously indicated problems and disadvantages may be solved satisfactorily by adopting a nebulizing method by which a liquid sample to be analyzed is sprayed into finely divided particles before the same is introduced into the MS whereby even compounds which have been otherwise difficult to be analyzed on any conventional MS may also be handled with quite ease. This sample nebulizing method is found considerably effective and advantageous.

Accordingly, it is the principal object of the present invention to provide method and apparatus for introducing liquid samples to a mass spectrometer.

It is another object of this invention to provide method and apparatus for facilitating the vaporization of most of the polar and/or large molecular-weight compounds before the introduction thereof to the ion source of the MS, which is otherwise difficult conventionally, thereby making it possible to measure the mass spectra and in addition, to permit a continuous and stable introduction of the liquid sample to the MS.

Further object of the invention is to provide an interface for connecting an LC, particularly an HLC directly to an MS, thereby allowing an LC-MS analizing procedure to be put into practice.

It is still a further object of the invention to provide a simply-constructed, easy-to-operate and highly efficient sample introducing apparatus wherein the liquid sample is sprayed into finely divided particles by use of a nebulizing method for attaining easy and effective vaporization and continuous supply of the sample to the MS and, at the same time, making it possible to achieve the concentration of the liquid samples which has been considered difficult on any conventional apparatus.

Other objects of this invention will become apparent to those skilled in the art from the following detailed description of the preferred embodiments when read in connection with the accompanying drawings.

To attain these objects of this invention, a nebulizing gas is supplied to a nebulizing means and spurted forth from a nozzle portion of the nebulizing means while a liquid sample is continually fed to the nozzle portion whereby the liquid sample is nebulized by a jet stream of the nebulizing gas gushed from the nozzle portion and the liquid sample thus nebulized is finally introduced to an ion source of a mass spectrometer (MS). Another feature of this invention to effect the foregoing objects is the provision of a double-tubing capillary mainly acting as a part of the nebulizing means and comprising an external tube and an internal tube received coaxially within the external tube. The liquid sample is conducted through the internal tube while the nebulizing gas is introduced through a space formed between an outer surface of the internal tube and an inner surface of the external tube whereby the liquid sample is nebulized in stable and effective way at the nozzle portion located at one end of the double-tubing capillary.

In accordance with this invention previously characterized, the liquid sample fed to and ejected from the nozzle portion at the end of the double-tubing capillary described above as nebulized or sprayed into fine particles by the jet stream of the nebulizing gas spurted from the nozzle portion and thus becomes extremely easy to vaporize. Thus, this invention is significantly effective for vaporizing polar and/or large-molecule compounds or any organic compounds of which mass spectrometric measurement is conventionally difficult, and for achieving efficient mass spectrometric detection and identification thereof. The liquid sample sprayed into fine particles in such manner as previously stated by the nebulizing means is continuously and stably introduced to the ionizing portion of the MS because most of the sprayed particles are vaporized in advance through the aid of heat applied thereto and/or under a high degree of vacuum established in the MS although a portion of the liquid sample enters the ionizing portion while remaining in a state of fine particles. Another feature of the invention is that the neblization of the liquid sample is carried out in an evacuated chamber and the nebulized sample is then conducted to another chamber under reduced pressure. Therefore, a volatile solvent in the liquid sample is vaporized and the vaporized solvent is sucked into an evacuation source (vacuum source) which maintains the solvent vapor under the reduced pressure whereby the solvent in the fine particles of the nebulized sample is removed resulting in the concentration of the solute (the desired constituent of the liquid sample). Furthermore, the apparatus in accordance with this invention is extremely easy to operate, significantly simple in construction and considerably low in manufacturing cost because the objects of the invention are attained simply by nebulizing the liquid sample.

BRIEF DESCRIPTION OF THE DRAWINGS

This invention is illustrated in the accompanying drawings wherein.

DETAILED DESCRIPTION OF THE PREFERRED EMBODIMENTS

Figure 1:
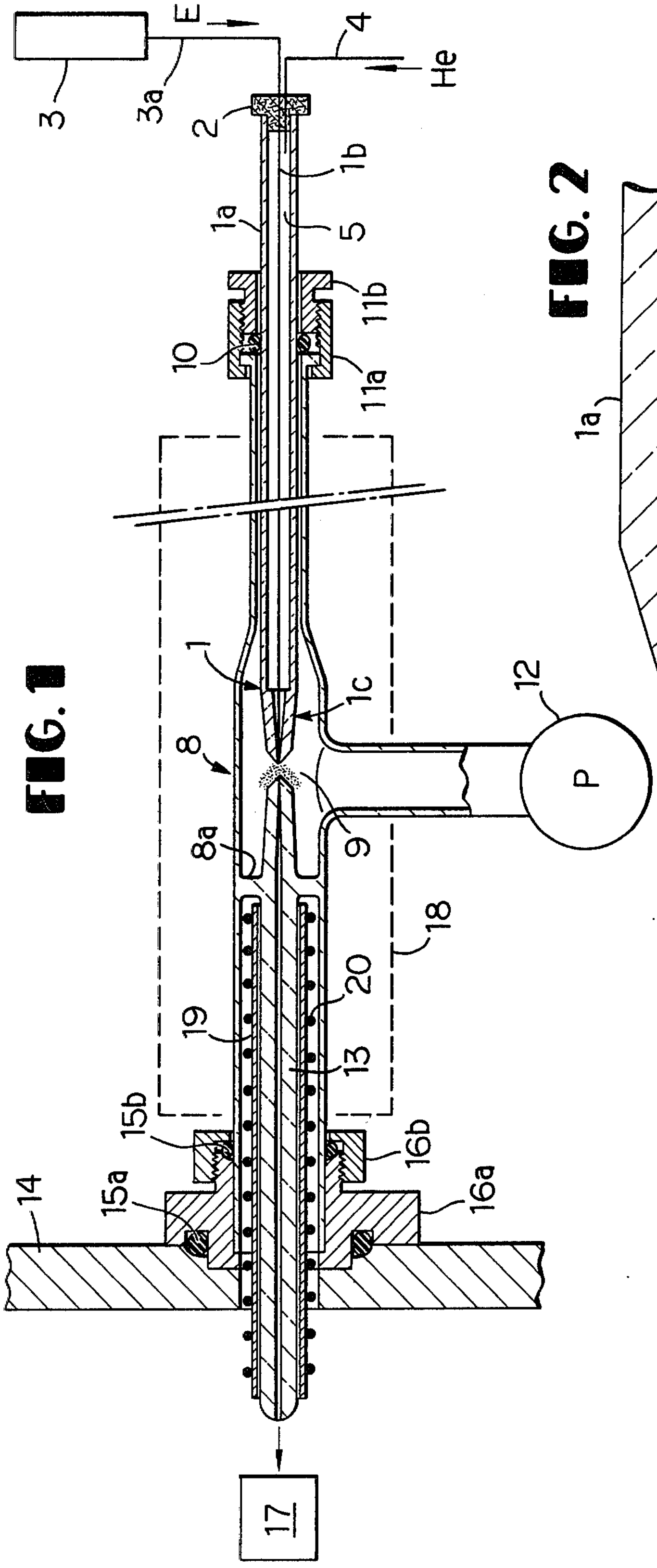
FIG. 1 is a sectional view of a preferred embodiment of an apparatus (interface) constructed in accordance with this invention.
Figure 2:
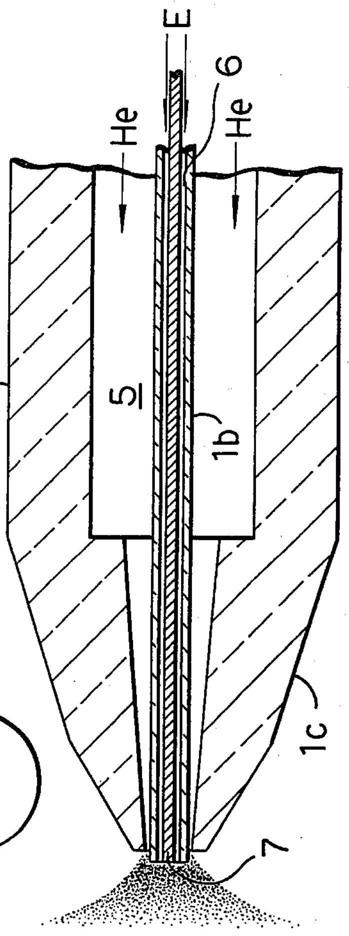
FIG. 2 is an enlarged sectional view of a nebulizing nozzle portion of the apparatus presented in FIG. 1.

Referring now more particularly to the accompanying drawings which illustrate preferred embodiments of this invention, a cross sectional view of an apparatus (interface) in accordance with the invention is presented in FIG. 1 wherein the apparatus is provided with a nebulizing nozzle portion whose enlarged sectional view is given in FIG. 2. In the drawings, a double-tubing capillary 1 comprises an external tube 1*a* of heat-resistant or heat-resisting glass and an internal tube 1*b* also of heat-resistant glass being coaxially received within the external tube 1*a*. The internal tube 1*b* is inserted past a plug 2 fitting in one end of the external tube 1*a* and connected to a conduit 3*a* which is in communication with a column 3 of a liquid chromatograph (LC), whereby an effluent E from the column 3 is conducted into the internal tube 1*b*. A nebulizing gas [Helium (He) is used herein.] from the supply source not shown in the drawing is introduced into a passage 5 formed between an inner surface of the external tube 1*a* and an outer surface of the internal tube 1*b*, through the conduit 4 penetrating the plug 2. As illustrated in FIG. 2, the external tube 1*a* has progressively decreasing inside and outside diameters at the other end thereof opposite to the one in which the plug 2 is fitted, and the internal tube 1*b* extending through this progressively decreasing diameter portion projects a slight distance away from said other end of the external tube 1*a*, whereby the nebulization of liquid samples is attained with higher efficiency as described later. Thus, the end portions of the external and internal tube 1*a* and 1*b* constitute a nebulizing nozzle portion 1*c* of the double-tubing capillary 1. Within the internal tube 1*b* including the nozzle portion 1*c*, there is inserted a piano (steel) wire 7 as a core thereof which is given a proper amount of clearance from the inner surface of the internal tube 1*b* to provide a passage 6 through which the effluent E is continuously and stably fed to and ejected or discharged from the end of the nozzle portion 1*c* (internal tube 1*b*). The nozzle portion 1*c* of the double-tubing capillary 1 of this preferred embodiment has the specifications which follow:

The external tube 1*a* is 0.4 mm in inside diameter, the internal tube 1*b* 0.35 mm and 0.15 mm in outside and inside diameters, respectively, and the piano wire 7 0.13 mm in diameter. The projecting distance of the internal tube 1*b* from the end of the external tube 1*a* is approximately 0.3 mm.

The double-tubing capillary 1 as specified above is inserted into a heat-resistant glass tubular body 8 from one end of the same body 8, in such way that the nozzle portion 1*c* thereof is located within a nebulizing chamber 9 formed within the interface body 8 with a partition wall 8*a*, and secured to said one of the interface body 8 by a cap nut 11*a* and a threaded retainer plug 11*b* through an O-ring 10 whereby the nebulizing chamber 9 is sealed to an evacuation system. The nebulizing chamber 9 is connected to a rotary vacuum pump 12 by which an intended degree of reduced pressure (vacuum) is maintained in the chamber 9. A heat-resistant glass tube 13 introducing the nubulized sample to the MS is formed coaxially and as a integral part of the interface body 8, penetrating the partition wall 8*a*. In the nebulizing chamber 9, one end of the introduction tube 13 is opposed to the end of the nozzle portion 1*c* of the double-tubing capillary 1 as an orifice through which the nubulized sample from the nozzle portion 1*c* enters into the introduction tube 13. The orifice of this embodiment is of 0.5 mm diameter. The other end of the introduction tube 13 is extended into a body 14 of the MS through an end portion of the interface body 8 which is secured to the end of the body 14 by a retainer screw 16*a* and a nut 16*b* through O-rings 15*a* and 15*b*, and connected to an ordinary ionizing chamber 17 provided in the MS, whereby the liquid sample (effluent E) nebulized in the nebulizing chamber 9 is introduced into the ionizing chamber 17.

A portion of the interface body 8 including the nebulizing chamber 9 is heated to any desired temperature not higher than approx. 300° C. in the nebulizing chamber 9 and its vicinity by a heating oven 18 (shown in FIG. 1 by dashed lines) disposed round the interface body 8, for the purpose of compensating for the latent heat of vaporization of a solvent lost during nebulization of the effluent E. In addition, the introduction tube 13 is also heated as desired up to approx. 300° C. by a heater 20 through a heater sheath 19 disposed along the periphery thereof so as to permit the nebulized liquid sample to be introduced into the ionizing chamber 17 of the MS without being stuck or adsorbed to an inner surface of the tube 13 (due to condensation of the nebulized sample or any other causes).

In operation of the apparatus featuring such construction and arrangement as mentioned above, the effluent E from the column 3 of the LC is conducted through the conduit 3*a* into the internal tube 1*b* of the double-tubing capillary 1 and continually introduced into the nebulizing chamber 9 through the passage 6 formed between the internal tube 1*b* and the piano wire 7. The introduction of the effluent E into the nebulizing chamber 9 is accomplished either by evacuating the chamber 9 or by force-feeding the effluent E with use of a pump provided outside the interface system. On the other hand, the nebulizing gas He supplied through the conduit 4 is introduced into the passage 5 formed between the external and internal tubes 1*a* and 1*b* of the double-tubing capillary 1 and is spurted from the nozzle portion 1*c* of the capillary 1 at a high rate. Consequently, the effluent E fed to the end of the nozzle portion 1*c* is continuously sprayed into the nebulizing chamber 9 as finely divided particles by a jet stream of the nebulizing gas He. Because the nebulizing chamber 9 is maintained under an intended degree of reduced pressure by its exposure to a high level of vacuum in the MS as well as by the operation of the rotary pump 12 and because it is heated, at the same time, to prevent the solvent from dripping from or frosting on the nozzle portion 1*c* due to cooling effect mainly caused by the latent heat of vaporizaton, an aliquot portion of the nebulized effluent E (air sol) is freed of solvent and becomes dried air sol under vacuum and heat, and the entire air sol including the dried portion enters through the orifice into the introduction tube 13 and finally is introduced to the ionizing chamber 17 under higher vacuum in the MS. In this way, at least aliquots of a low-boiling solvent contained in the effluent E are vaporized in the nebulizing chamber 9 whereby the nebulized effluent E becomes more finely divided particles easy to vaporize. Further, the vaporized solvent is removed through suction by the rotary pump 12, and therefore the nebulized effluent E is easily concentrated (a higher degree of concentration of the desired constituent or solute may be easily achieved.). Thus, the concentrated particles of the effluent E are finally introduced to the ionizing chamber 17 thereby increasing the efficiency of mass spectrometric measurement of the effluent E. Although a minor portion of the finely divided particles containing the desired constituent (solute) to be measured is previously vaporized in the nebulizing chamber 9, a major portion thereof enters continually into the introduction tube 13 through the orifice opposing the nozzle portion 1*c* after being freed of solvent into more vaporous state, whereby the vaporization is efficiently effected while traveling through the tube 13 under higher vacuum of the MS and with heat applied thereto by the heater 20 and another heating source commonly provided in the MS. In accordance with this preferred embodiment of the invention as described so far, a liquid sample or effluent from the LC may be efficiently introduced to the MS by continuously nebulizing it into finely divided particles prior to the final introduction thereof to the MS. This means that the apparatus presented in the embodiment makes it possible to directly couple the MS to the LC.

Although it is so designed in this embodiment that the effluent E from the column 3 is entirely introduced into the internal tube 1*b* of the double-tubing capillary 1 through the conduit 3*a* which is directly connected to the tube 1*b*, it is of course possible to provide a proper splitter to feed only an aliquot portion of the effluent E into the internal tube 1*b*. However, the primary feature of the interface in accordance with this invention is its surpassing capability of directly coupling an MS with an LC (particularly HLC) into a combined analyzing system, which has not been offered on any conventional interfaces. Another feature of the interface of this invention is the ability to handle any ordinary solutions or liquids prepared as a sample to be introduced to the MS for mass spectrometric analysis, as well as effluents from the LC. In handling such prepared solutions or liquids, they are pumped into the internal tube 1*b*. Further feature of this invention is the versatility to employ a wide variety of nebulizing gas unless it has a disadvantageous effect on the mass spectrometric measurement. Gases usable as a nebulizing gas include: helium (He) as used herein, nitrogen, argon, methane, isobathane and ammonia.

While, in the previously described embodiment, the piano wire (not limited to the piano wire as far as it is made of a metal) is provided as a core wire within the internal tube 1*b* of the double-tubing capillary 1 to reduce dead volume of the tube 1*b* for continuous and stable introduction of the effluent E into the nebulizing chamber 9, a similar effect is obtained by using the internal tube 1*b* of a reduced inside diameter. Practicably, however, it is recommended that the internal tube be used with a core wire being inserted therein as in the previous embodiment when taking into account the ease of retention within the external tube (mechanical strength), servicing and maintenance thereof (ease of cleaning the nozzle portion 1*c* even when plugged). From the standpoint of such practicability, double-tubing capillary comprising an external tube and an internal tube is preferable also as a nebulizing means. Although the piano wire 7 is inserted over the entire length of the internal tube 1*b*, its length may be reduced as far as it can cover the nozzle end portion of the internal tube 1*b*.

And while the nebulizing chamber 9 of the previous embodiment of this invention is connected to the vacuum source 12 and the effluent E is nebulized under reduced pressure with significant efficiency, it is also possible to nebulize the effluent under atmospheric pressure by making use of Atmospheric Ionization (API) method well known as a means for ionizing gaseous samples. Further, to attain efficient introduction of the nebulized effluent into the MS, it is preferable that the diameter of the orifice at the end of the introduction tube 13 opposing the nozzle portion 1*c* be larger than the inside diameter of the external tube 1*a* at the end of the nozzle portion 1*c* and that the distance between the orifice of the introduction tube 13 and the end of the nozzle portion 1*c* be adjusted to suit the particular suction pressure of the rotary pump 12, amounts of the fine particles produced in the chamber 9 and those introduced into the MS, and so forth so that a proper level of pressure (for example, 1 Torr) is established in the chamber 9. The vaporized liquid sample (effluent) may be ionized in the MS by any one of the publicly known methods. For example, in case the amount of introduced solvent vapor is relatively large, the Chemical Ionization method using the solvent as a reagent gas is suitably applied. When the same amount is comparatively small, on the contrary, the ordinary Electron Impact Ionization or Field Ionization method is applicable.

Figures 3, 4:
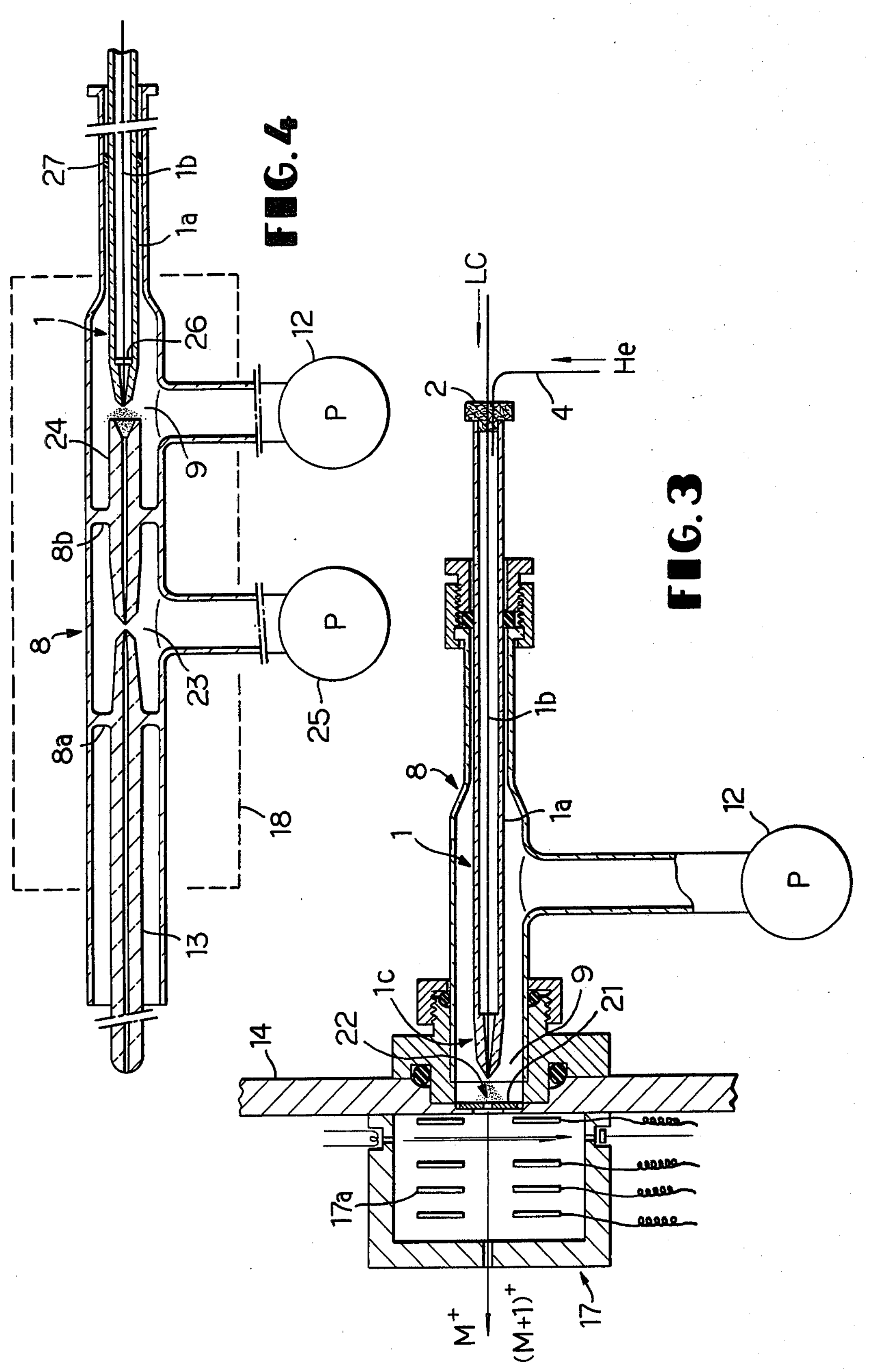
FIGS. 3 and 4 are sectional views of alternative preferred embodiments of the apparatus of the invention.

While a preferred embodiment has been described, it is to be understood that this invention is not limited to this precise form of method and apparatus, and that changes and modifications may occur to those skilled in the art without departing from the spirit and scope of the invention. As an example, there is illustrated in FIG. 3 an alternative embodiment of this invention presenting a modified interface which differs from that shown in FIG. 1. mainly in the means for introducing the nebulized effluent from the nebulizing chamber to an MS. While the interface shown in FIG. 1 may be connected to any conventional MS with substantially no modification of the latter, the interface presented in this alternative embodiment is specifically adapted to as MS wherein an ionization chamber is located adjacent to the wall of the MS body, and thus capable of introducing the nebulized liquid sample directly into the ionizing chamber of the MS. Any description of parts apparatus of this alternative embodiment similar to those of the previous embodiment is omitted herein by designating them with the same reference characters. The following description refers only to the difference in the parts arrangement and construction between the two embodiments. In the apparatus illustrated in FIG. 3, a pinhole 22 is provided in a plate-like member 21 attached to an outer wall of the MS body, as a means for introducing the nebulized effluent into the MS. The pinhole 22 is disposed so that it is opposed to the nozzle portion 1*c* of the double-tubing capillary 1. Through this pinhole 22, the liquid sample is sucked directly into the ionizing chamber 17 under a high degree of vacuum in the MS, and finally ionized therein after it is vaporized under such vacuum and heat generated by a heat source 17*a* commonly provided in the ionizing chamber 17. The apparatus of this alternative embodiment is recommended mainly because it is generally preferable that a length of travel of the nebulized liquid sample to the ion source (ionizing chamber) be as short as possible. Unlike the apparatus of the previous embodiment, the apparatus of this embodiment is not provided with the heating oven 18 to heat the nebulizing chamber 9. This is because the heat souce 17*a* in the ionizing chamber 17 is located adjacent to the nozzle portion 1*c* and is capable of supplying an appropriate quantity of heat to make up for the latent heat of vaporization during nebulization of the liquid sample in the nebulizing chamber 9. Of course, it is possible and necessary to provide a proper heating means such as the heating oven 18 and the heater 20 provided in the previous embodiment when the quantity of heat supplied from the ionizing chamber 17 is not sufficient.

There is shown in FIG. 4 another alternative embodiment of this invention which is characterized by the nebulizing chamber 9 and a following concentrating chamber 23 formed as integral parts of the interface body 8, and connected in series to each other by a connection tube 24 of heat-resistant glass. The concentrating chamber 23 is also connected to a rotary pump 25 whereby the concentrating chamber 23 is kept under reduced pressure lower than that in the nebulizing chamber 9. The connection tube 24 is formed with one end thereof being opposed to the nozzle portion 1*c* in the nebulizing chamber 9. The same end has a tapered bore progressively increasing in diameter toward the nozzle portion 1*c* for efficient introduction of the nebulized liquid sample from the nozzle portion 1*c* into the concentrating chamber 23. In addition, the introduction tube 13 is disposed so that one end thereof is opposed to the other end of the connection tube 24 located in the concentrating chamber 23. In the drawing, reference characters 8*b* indicate a partition wall similar to 8*a*, and numerals 26 and 27 represent spacers for retaining the internal tube 1*b* and the double-tubing capillary 1, respectively. As in the previous embodiment shown in FIG. 1, a heating oven 18 is provided round the interface body 8 for heating at least the nebulizing chamber 9, concentrating chamber 23 and their vicinity.

In the apparatus of this alternative embodiment having such construction and parts arrangement features as described above, the liquid sample is first sprayed from the nozzle portion 1*c* of the double-tubing capillary 1 into the nebulizing chamber 9 under an intended level of reduced pressure, and concentrated therein to a certain extent. The liquid sample thus nebulized and partially concentrated is then fed through the connection tube 24 into the concentrating chamber 23 of more reduced pressure wherein a solvent present in the sample is vaporized and removed (sucked into the rotary vacuum pump 25) for more concentration of the desired constituent or solute. From the concentrating chamber 23, the sample is conducted into the MS through the introduction tube 13. Thus, the liquid sample is introduced into the MS with significantly high efficiency. Experiments by the inventors revealed that an interface having such concentrating chamber was able to connect the MS directly to a large-capacity LC of effluent flow rate as high as 200 μl/min. Although this alternative embodiment uses only one concentrating chamber, there may be employed two or more concentrating chambers provided that they are connected to respective vacuum sources and evacuated to progressively reduced pressures from the nebulizing chamber to the MS.

As detailed above, the present invention provides simplified method and apparatus for directly connecting a liquid chromatograph (LC), particularly a high-performance liquid chromatograph (HLC) to a mass spectrometer (MS) without using any complicated devices conventionally available, for the purpose of continuous and stable mass spectrometric measurement of a liquid sample, either liquid or solution, more commonly an effluent directly from a column of the LC (HLC) or a portion thereof extracted through a simple and ordinary splitter, or any other liquid samples prepared for the mass spectrometric analysis. Such a liquid sample is first sprayed into finely divided particles by a nebulizing means including a double-tubing capillary to facilitate vaporization of the sample, and finally introduced into an ionizing portion of the MS in continuous and stable manner. The provisions of such method and apparatus in accordance with this invention is extremely significant because of the following advantages and features: At first, operation of a combined LC-MS analyzing system is made easier than ever before. Secondly, it becomes possible to attain concentration of an effluent or any other liquid sample which is conventionally considered a difficult practice. Thirdly, it is made possible to handle a wide range of samples for mass spectrometric detection and identification, including comparatively difficult-to-vaporize compounds of low vapor pressure, and polar or large-molecule compounds such as aromatic amines, drug components, steroids, amino acids, oligopeptides and polyethyleneglycols. In addition, the apparatus of this invention is considerably high in performance and practicability, comparatively low in manufacturing cost as it is made of a glass, and in addition, highly inert to components of a sample (solute and solvent).

What is claimed is:

1. A method for continuously introducing a large molecular weight compound in vapor and fine particle form to an ion source of a mass spectrometer which comprises:

supplying a nebulizing gas to a nebulizing means;

spurting said nebulizing gas from a nozzle portion of said nebulizing means while continuously introducing a liquid solution of said compound to said nozzle portion whereby a portion of said liquid solution is nebulized into finely divided particles by a jet stream of said nebulizing gas spurted from said nozzle portion and another portion of said liquid sample is vaporized; and introducing the nebulized liquid solution to an ionizing portion of said mass spectrometer.

2. A method according to claim 1 and further comprising:

heating at least a space wherein said liquid solution is nebulized.

3. A method according to claim 1 and further comprising:

nebulizing said liquid solution under reduced pressure.

4. A method according to claim 1 and further comprising:

introducing said nebulizing liquid solution into a concentrating chamber of more reduced pressure;

removing at least a portion of solvent present in said nebulized liquid solution thereby concentrating said compound of said solution; and finally introducing said nebulized solution containing thus concentrated compound to said ionizing portion of the mass spectrometer.

5. A method according to any one of claims 1 through 4, wherein:

said liquid solution to be introduced to the nozzle portion of said nebulizing means is at least an aliquot portion of an effluent from a column of a liquid chromatograph.

6. An apparatus for continuously introducing a sample compound in vapor and fine particle form into an ion source of a mass spectrometer which includes:

nebulizing means to form said compound into vapor and fine particle form, comprising a double-tubing capillary which consists of an external tube and an internal tube coaxially received within said external tube, said double-tubing capillary including a nozzle portion at one end thereof from which a nebulizing gas supplied thereto through a passage formed between said external and internal tubes is spurted as a jet stream, and means to feed said sample compound in liquid solution form through said internal tube;

a nebulizing chamber enclosing a space receiving the nozzle portion at said one end of said double-tubing capillary; and introduction means for introducing said liquid sample nebulized in said nebulizing chamber into an ionizing portion of said mass spectrometer.

7. An apparatus according to claim 6 and including: at least means for heating at least said nebulizing chamber and its vicinity.

8. An apparatus according to claim 6, further comprising a metal wire inserted in said internal tube of said double-tubing capillary and coaxial therewith.

9. An apparatus according to claim 8, wherein:

said metal wire is a piano wire.

10. An apparatus according to claim 6, wherein:

one end of said internal tube forming a part of the nozzle portion at said one end of said double-tubing capillary is projected a slight distance beyond the corresponding end of said external tube.

11. An apparatus according to claim 6, wherein:

said nebulizing chamber is connected to a vacuum source.

12. An apparatus according to claim 6, wherein said introduction means comprises:

an introduction tube disposed so that one end thereof is opposed to the nozzle portion of the double-tubing capillary in said nebulizing chamber while the other end thereof is open to the ionizing portion of the mass spectrometer; and a secondary heating means for heating said introduction tube to prevent the nebulized sample from condensing on and/or adhering to an inner surface of said introduction tube.

13. An apparatus according to claim 6, wherein:

said introduction means is a plate-like member facing the nozzle portion of the double-tubing capillary in said nebulizing chamber;

said plate-like member having a pinhole therein through which the nebulized sample is introduced directly to the ionizing portion of the mass spectrometer.

14. An apparatus according to claim 11 and further comprising:

at least one concentrating chamber following and connected in series to said nebulizing chamber;

said concentrating chamber being also connected to a vacuum source;

said vacuum source of said concentrating chamber maintaining said concentrating chamber under more reduced pressure than that in said nebulizing chamber whereby nebulized solution is introduced from said nebulizing chamber into said concentrating chamber wherein at least a portion of a solvent present in the nebulized solution is removed and the sample compound is concentrated before the nebulized solution is finally introduced into the ionizing portion of the mass spectrometer.

15. An apparatus according to claim 14, wherein said introduction means includes:

a connection tube formed with one end thereof being opposed to the nozzle portion of the double-tubing capillary in said nebulizing chamber, said one end of said connection tube having a tapered bore therein progressively increasing in diameter toward said nozzle portion.

16. An apparatus according to any one of claims 6 through 15 wherein:

the internal tube of said double-tubing capillary is connected to a passage of an effluent from a liquid chromatograph whereby at least an aliquot portion of said effluent is conducted into said internal tube.

17. Apparatus according to claim 6, wherein said double-tubing capillary is formed of glass.

18. An apparatus according to claim 6, wherein the internal bore of the external tube of said capillary is tapered to provide a progressively diminishing cross-section area toward the capillary outlet of the annular space between the internal and external tubes.

19. An apparatus according to claim 8, wherein the external tube has an inside diameter at said end of about 0.4 mm, said internal tube has an outside diameter of about 0.35 mm and an inside diameter of about 0.15 mm, and said wire has a diameter of about 0.13 mm.

* * * * *